United States Patent

[11] 3,631,253

[72] Inventors Ralph Edward Aldrich Woburn; Paul John Caruso, Bedford; Donald Sears Oliver, Acton, all of Mass.

[21] Appl. No. 828,657

[22] Filed May 28, 1969

[45] Patented Dec. 28, 1971

[73] Assignee Itek Corporation Lexington, Mass.

[54] LOGIC COMPARATOR USING BIREFRIGENT MEDIUM

27 Claims, 6 Drawing Figs.

[52] U.S. Cl. ........................................................ 250/219, 250/225, 356/71, 340/173

[51] Int. Cl. ........................................................ G08c 9/06

[50] Field of Search ............................................ 250/219, 213, 225, 220; 356/150, 151, 71; 340/173 LS

[56] References Cited

UNITED STATES PATENTS

| | | | |
|---|---|---|---|
| 3,403,261 | 9/1968 | Bowers et al. | 250/225 X |
| 3,403,262 | 9/1968 | Seidel | 340/173 X |
| 3,423,736 | 1/1969 | Ash et al. | 340/173 |
| 3,517,206 | 6/1970 | Oliver | 250/225 |
| 2,936,380 | 5/1960 | Anderson | 350/150 |
| 3,407,017 | 10/1968 | Fleisher et al. | 350/150 |
| 3,449,583 | 6/1969 | Eden | 250/217 |
| 3,502,875 | 3/1970 | Ploss et al. | 350/150 |

*Primary Examiner*—Walter Stolwein

*Attorneys*—Homer O. Blair, Robert L. Nathans and David E. Brook

ABSTRACT: Apparatus is disclosed for comparing a first item of information represented by the sense and magnitude of the relative retardation of components of radiation with a second item of information represented by the sense and magnitude of relative retardation imposed on components of radiation by a birefringent medium by modulating the relative retardation of components of radiation which retardation is representative of the first item of information with the relative retardation imposed on components of radiation by the birefringent medium and detecting a component of the modulated radiation representative of the combination thereof.

INVENTORS.
DONALD S. OLIVER
RALPH E. ALDRICH
PAUL J. CARUSO

BY Joseph S. Iandiorio
ATTORNEY.

INVENTORS.
DONALD S. OLIVER
RALPH E. ALDRICH
PAUL J. CARUSO

BY Joseph S. Iandiorio
ATTORNEY.

LOGIC COMPARATOR USING BIREFRIGENT MEDIUM

CHARACTERIZATION OF INVENTION

The invention is characterized in an optical comparator comprising a birefringent medium for producing relative retardation of components of incident radiation, whose sense and magnitude is representative of a first item of information, means for exposing the birefringent medium to radiation exhibiting a sense and magnitude of relative retardation of its components representative of a second item of information, and means for detecting a component of the radiation from the means for exposing, modulated by the birefringent medium, representative of the comparison of the sense and magnitude of relative retardation of components of radiation from the means for exposing and of relative retardation imposed on components of radiation by the birefringent medium, representative of the first and second items of information.

BACKGROUND OF INVENTION

This invention relates to an optical comparator, and more particularly to such a comparator capable of detecting the simultaneous presence or absence of two similar items of information.

Conventional optical comparators wherein the binary states such as "1" and "0" are defined by the presence and absence of radiation are incapable of executing the logic statement A and B or not A and not B equals coincidence unless the information is stored redundantly which increases the required memory capacity. In Boolean form that expression is $(A \cdot B)+(\bar{A} \cdot^{a} \cdot \bar{B})=1$. The ability to perform this statement is useful in information retrieval operations with content addressed memories and in difference detection devices.

SUMMARY OF INVENTION

Thus it is desirable to have available an improved optical comparator capable of more efficiently executing the logic statement $(A \cdot B)+(\bar{A} \cdot \bar{B})=1$.

It is also desirable to have available improved optical information retrieval apparatus.

It is also desirable to have available improved optical difference detecting apparatus.

It is also desirable to have available an optical comparator for comparing first and second items of information each represented by the sense and magnitude of relative retardation of radiation components.

It is also desirable to have available such a comparator in which the two possible senses of relative retardation of components of radiation may represent the binary states of each item of information.

It is also desirable to have available such a comparator in which the magnitude as well as the sense of relative retardation of components of radiation are representative of first and second items of information.

It is also desirable to have available such a comparator in which similar quantities of information are represented by opposite senses of relative retardation of components of radiation in two items of information to be compared and differences are represented by variations in magnitude of relative retardation of components of radiation.

The invention may be accomplished by an optical comparator including a birefringent medium for producing relative retardation of components of radiation, which retardation sense and magnitude is representative of a first item of information. The birefringent medium is exposed to components of radiation whose relative retardation sense and magnitude represent a second item of information. A component of the resulting radiation, the relative retardation of whose components has been modulated by the relative retardation imposed on that radiation by the birefringent medium, is detected as a comparison of the respective relative retardations of the components and thus also items of information represented thereby.

DISCLOSURE OF PREFERRED EMBODIMENT

Other objects, features and advantages will occur from the following description of a preferred embodiment and the accompanying drawings, in which.

Figures 1, 3, 4, 5:
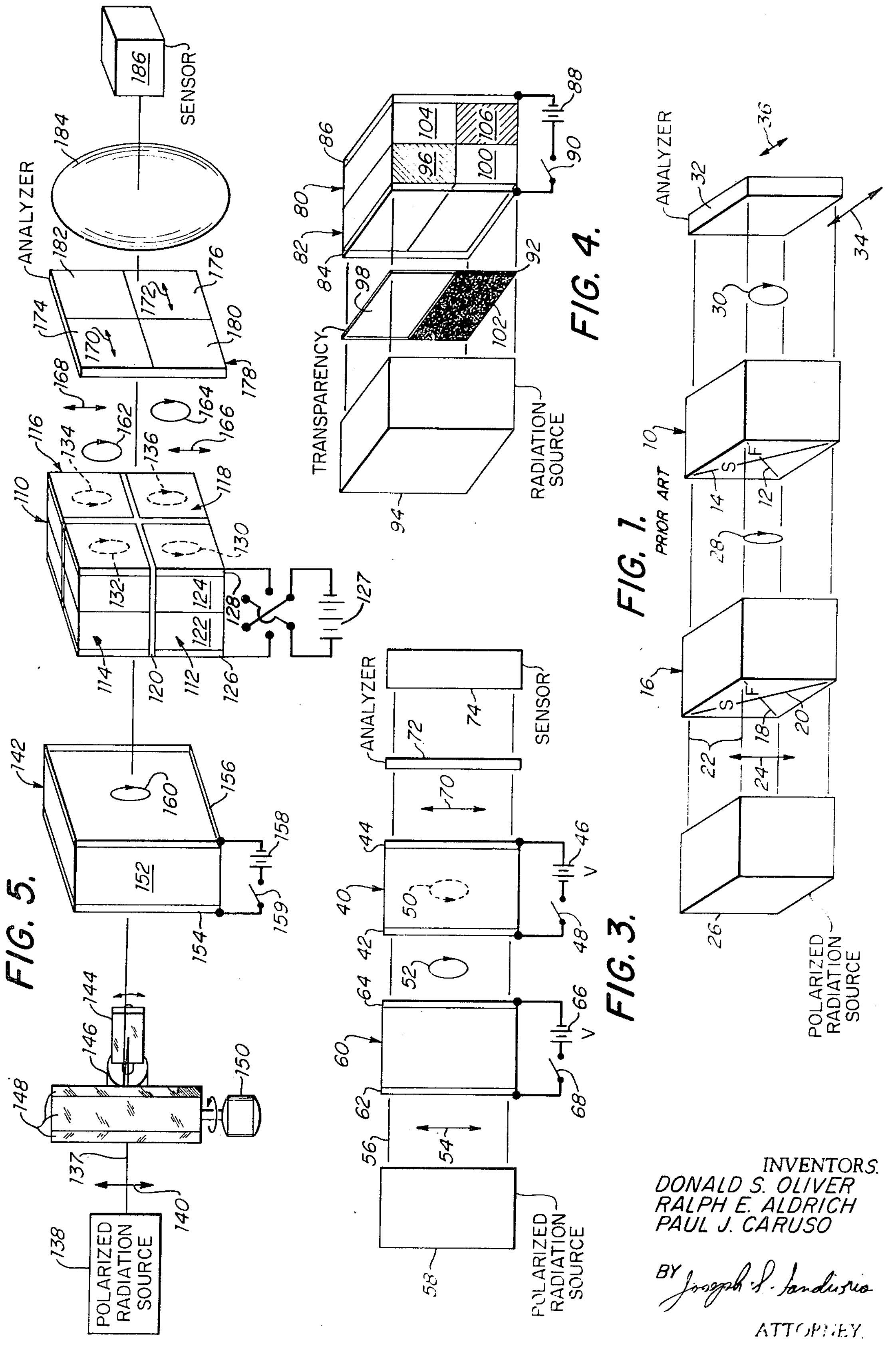
FIG. 1. PRIOR ART, FIG. 3, FIG. 4, FIG. 5
FIG. 1 is an axonometric diagram of an optical comparator according to the prior art using two birefringent devices.
FIG. 3 is a diagram similar to FIG. 1 using two electro-optic birefringent devices.
FIG. 4 is an axonometric diagram of apparatus for applying an electric field, whose variations in intensity represent information, to an electro-optic birefringent device.
FIG. 5 is an axonometric diagram of a system for performing a content address readout of an optical memory.

The invention may be practiced with a birefringent medium which produces relative retardation of components of radiation of a sense and magnitude that represents a first item of information. Components of input radiation whose relative retardation sense and magnitude represent a second item of information are submitted to the birefringent medium. If a component, detectable by a crossed analyzer, of the output radiation formed by the input radiation modulated by the birefringent medium is larger than that component of the input radiation, then the two relative retardations are of the same sense, if smaller, then the two relative retardations are of opposite sense. If the magnitudes of both relative retardations are equal, then relative retardations of like sense double relative retardation of the output radiation components, and relative retardations of opposite sense produce zero retardation. The elliptical field of the output radiation may be viewed through a crossed analyzer to convert the relative retardation levels into more facile equivalent intensity levels.

The invention may be embodied in a logic comparator or content addressable memory system by using an electro-optic birefringent medium whose birefringence may be varied to produce a first sense of relative retardation of components of radiation to represent a binary 1 and a second sense of relative retardation of components of radiation of equal magnitude to represent binary 0 in accordance with an electric field applied to the electro-optic medium. Read-in is accomplished by applying the electric field. Readout is accomplished by exposing the electro-optic medium to radiation whose components have relative retardation of either sense and equal magnitude. If the relative retardation of the components of the readout radiation is of the first sense, then double relative retardation of the components of the output radiation indicates a binary 1 is stored and zero relative retardation indicates a binary 0 is stored: zero intensity emanating from the crossed analyzer indicates a 0, a predetermined level of intensity indicates a 1. The converse is true when the relative retardation of the components of the readout radiation is of the second sense.

The invention may also be employed in a difference (or sameness) detection system such as an image comparator. A first image is projected on a first device including a first photoconductor layer combined with a first electro-optic birefringent layer between a first pair of electrodes having an electric potential of a first polarity across them. The incident image varies the conductance of the photoconductor layer in a pattern representative of the intensity pattern of the image, thereby varying the electric field across the electro-optic layer in a similar pattern. The relative retardation producible in components of radiation by the entire electro-optic layer is of a first sense dependent on the polarity of the electric field, but the magnitude of the relative retardation varies as a function of the variations in the intensity of the electric field. A second image is projected on a second device identical with the first but having an electric field of reverse polarity applied across its electrodes: the relative retardation sense is opposite but the magnitude varies as a function of the variations in the electric field intensity. Plane polarized radiation is shone through the electro-optic layer of the first device and receives relative retardation of the first sense and of a magnitude whose variations are representative of the first image. That radiation is then submitted to the second device and there its components are subjected to relative retardation of the opposite, second, sense and of a magnitude whose variations represent the second image. In areas of equal image intensity the retardation magnitudes are equal but opposite so plane polarized radiation parallel to the input radiation is produced which produces no cross-component when viewed through a crossed analyzer. Thus radiation transmitted by the analyzer indicates a mismatch between the first and second images and the intensity of that radiation indicates the extent of the mismatch.

Able to be compared by means of this invention is optical information presented as electric fields such as provided by a device having an electro-optic layer of e.g. KDP, DKDP, lithium niobate combined with a photoelectret layer of e.g. amorphous ZnS, ZnSe, ZnTe, CdS; or a device having a layer containing both an electro-optic and photoelectret medium e.g. cubic (100) ZnS, ZnSe, ZnTe, CdS; combined with a blocking layer e.g. polystyrene, $SiO_2$; or a device having a layer containing an electro-optic and a ferroelectric medium e.g. barium titanate, bismuth titanate combined with a layer of an amorphous photoconductor and optical information presented as momentary electric fields provided by devices having a layer containing a photoconductor and electro-optic medium, e.g. CdS, KDP. As used in this invention, the term "photoelectret"c means a device which achieves separation of positive and negative charges in a photoconductive insulating material by simultaneous irradiation with actinic radiation and the application of an electric field. The charges are subsequently trapped and remain fixed or frozen in the material for a sufficient time to form an internal polarization field. A more detailed description of photoelectrets can be found in Schaffert, R. M.; Electrophotography, Focal Press Limited (1965) in Chapter III at page 59 et seq. The storage devices may be distinguished from the momentary or real time devices by presence of a blocking medium for preventing charge leakage to maintain the electric field for a substantial period of time. The blocking medium may be a separate dielectric layer or may be an electro-optic medium which also functions as a blocking layer.

The invention may be embodied in a system in which a first item of information is represented by the sense and magnitude of relative retardation produced in components of radiation by a naturally birefringent crystal 10 such as calcite($CaCO_2$). The birefringent characteristic of crystal 10 resolves incident radiation into two components along two axes referred to as the fast 12 and slow 14 axes. The difference in speed of the radiation propagating along those two axes causes a relative retardation between the components of that radiation which increases with path length through the crystal. A second item of information may be represented by a second crystal 16 having fast 18 and slow 20 axes similar to crystal 10. Components of plane polarized radiation 22, arrow 24, from source 26 are modulated by the relative retardation induced by crystal 16 to produce an elliptically polarized radiation field 28. This field is modulated by the relative retardation induced by crystal 10 to produce less eccentric elliptically polarized radiation field 30. The relative retardation modulation is additive because the elliptically polarized fields produced have the same rotation, clockwise as shown, due to the similar placement of their fast and slow axes. Had one of the crystals exhibited the capability to produce relative retardation of the opposite sense, resulting in an elliptical field of counterclockwise rotation, the equal magnitude but opposite sense of the relative retardation would have resulted in plane polarized output radiation from crystal 10 parallel to arrow 24. When passed through crossed analyzer 32, having its polarizing axes oriented as indicated by arrow 34, the field 30 produces a component 36 indicating that the sense and magnitude of the relative retardation producible by crystals 10 and 16 thus the items of information they represent are the same. For example, if the relative retardation producible by crystal 16 is known to be the sense representative of binary 1, the detected component 36 indicates that a binary 1 is also present in crystal 10. The crystals of FIG. 1 need not be employed singly. A plurality of such crystals arranged in a matrix or the like may be used to compare patterns of information or store and retrieve information.

Figures 2, 6:
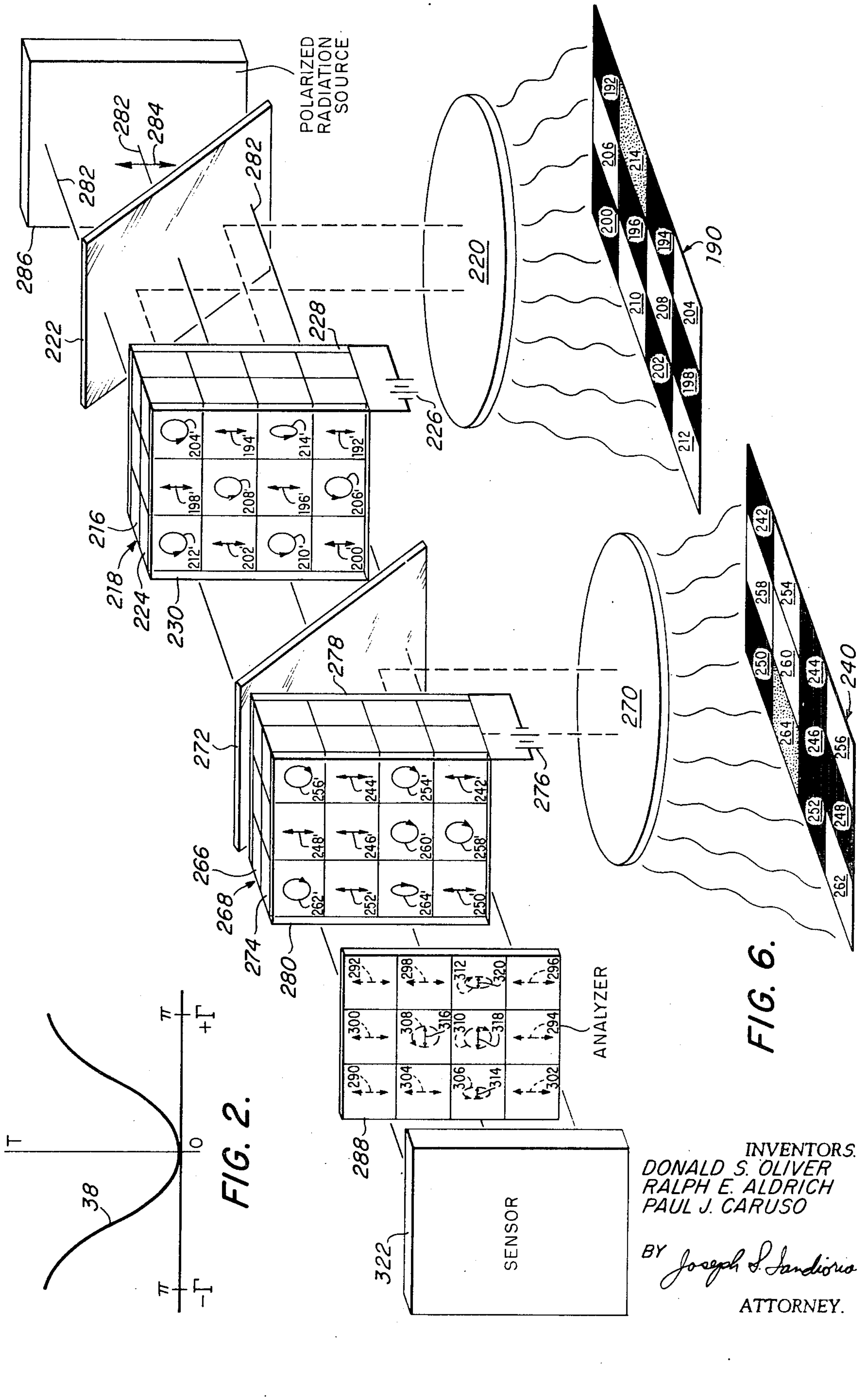
FIG. 2 shows a characteristic curve of relative retardation versus transmissivity of a crossed analyzer used to detect comparisons according to this invention.
FIG. 6 is an axonometric diagram of a system operating as a difference detector to compare two similar images or patterns of information.

The relationship of relative retardation $\Gamma$ to transmissivity T of the crossed analyzer is shown by the characteristic curve 38 in FIG. 2. As relative retardation increases from zero in either sense, designated plus (+) and minus (−), the transmissivity T increases to a maximum where $\Gamma$ equals $\pi$. Initially at zero relative retardation the output radiation field is parallel to the input radiation field. As birefringence increases the relative retardation increases and produces an elliptical field having a component parallel and nearly equal to the field of the plane polarized image radiation, and a component orthogonal to and very much smaller than the parallel component. As the birefringence increases the parallel component decreases and the orthogonal component increases. At 90° retardation between the radiation traveling the two birefringent axes, the field is circular. As $\Gamma$ increases from $\pi/2$ to $\pi$, the orthogonal component continues to increase and the parallel component to decrease. At $\Gamma$ equal to $\pi$, the transmissivity T is maximum and decreases for further increases in $\Gamma$ from $\pi$ to $2\pi$. From FIG. 2 it is apparent that any particular value of $\Gamma$ regardless of sense results in the same transmissivity T.

A system similar to that of FIG. 1 using electro-optic materials whose birefringence varies as a function of an applied electric field is shown in FIG. 3. A first item of information may be represented by the sense and magnitude of relative retardation producible in components of radiation by electro-optic medium 40 subject to the electric field between electrodes 42, 44 connected with battery 46 by switch 48. The elliptically polarized field 50 of radiation produced by that relative retardation has counterclockwise rotation. A second item of information may be represented by the sense and magnitude of relative retardation indicated by elliptically polarized field 52 of radiation and produced by the modulation of plane polarized, arrow 54, radiation 56 from source 58 by electro-optic birefringent medium 60 subject to the electric field between electrodes 62, 64 connected to battery 66 through switch 68. Since the voltage V applied to both sets of electrodes is equal, the intensities of the electric field across mediums 40 and 60 are equal, but the fields are of opposite polarity because the batteries 46, 66 are connected oppositely to one another. Therefore the relative retardations producible by mediums 40 and 60 are of opposite sense as are the directions of rotations of the elliptically polarized radiation fields 50, 52 resulting from those retardations. Consequently, when the components of radiation field 50 are modulated by the equal but opposite relative retardation of medium 40 the result is plane polarized radiation field 70 which when viewed through crossed analyzer 72 produces no output to sensor 74. Had the polarity of either battery 46 or 66 been reversed or had either medium been one which provides relative retardation of the opposite sense as shown by fields 50, 52, when energized as shown, the analyzer 72 would detect a cross component, indicating the degree of similarity of the sense and magnitude of relative retardation and of information represented by field 52 and medium 40.

A technique for associating an electric field representative of an item of information or a plurality of items of information, such as an image, with an electro-optic birefringent medium 80 combined with photoconductive medium 82 between a pair of electrodes 84, 86 energized by battery 88 in series with switch 90 is shown in FIG. 4. Photoconductive medium 82 is irradiated through transparency 92 with radiation from source 94. Section 96 of medium 82 struck by high intensity radiation transmitted through low density portion 98 of transparency 92 is highly conductive whereas section 100 of medium 82 struck by low intensity radiation transmitted through high density portion 102 of transparency 92 is less conductive. As a result the electric field at section 104 of medium 80 is more intense than that at section 106 thereby causing section 104 to have more pronounced birefringence and produce greater relative retardation of components of radiation than section 106 in a pattern similar to that of transparency 92. If medium 80 is an electrically blocking material as well as an electro-optic birefringent medium, the charges which have penetrated medium 82 under influence of the radiant image incident on medium 82 may be trapped when the radiation and the electrical energy from battery 88 are no longer present resulting in a storage of the electric field intensity pattern representative of the image.

A content addressed memory system including a memory device 110 having four identical storage locations 112, 114, 116, 118 separated by insulation 120 is featured in FIG. 5. Each such storage location as shown specifically with reference to location 112 includes a photoelectret layer 122 combined with an electro-optic birefringent layer 124 between electrodes 126, 128 which are used to apply an electric field of the desired polarity during the information storage operation. Since the system in FIG. 5 is a binary storage system the radiation used to store both 1's and 0's is of equal intensity only the sense of the relative retardation imposed on the radiation is varied to differentiate between the 1's and 0's. One method of varying the sense of the relative retardation is by varying the polarity of the field across the electro-optic layer during exposure or read-in. This can be done by reversing switch 127 connected to electrodes 126 and 128. In FIG. 5 binary 1's are represented by clockwise rotation of the elliptical radiation field produced and binary 0's by counterclockwise rotation. As indicated at 130, 132, 134, 136, 1's are stored in locations 114 and 118 and 0's are stored in locations 112 and 116. Plane polarized radiation 137 from source 138 polarized as indicated by arrow 140 is scanned in a raster pattern over readout device 142 by means of oscillating mirror 144 driven by motor 146 and rotating mirror 148 driven by motor 150. Electro-optic layer 152 between electrodes 154, 156 is subject to an electric field derived from battery 158 through switch 159 having the polarity required to produce relative retardation of the sense indicative of a binary 1 to produce an elliptically polarized field 160 of clockwise rotation from radiation 137. The intensity of the electric field is the same as that applied by the photoelectret layer of device 110 to produce the relative retardation indicative of binary 1's and 0's. As radiation 137 is scanned field 160 penetrates the storage locations 112, 114, 116, 118 and its components are further modulated by the relative retardation producible by electro-optic layers at those locations. When field 160 is modulated by relative retardation of the same sense and equal magnitude at locations 114, 118, fields 162, 164 are produced, whereas when field 160 encounters relative retardation of opposite sense and equal magnitude at locations 112, 116 plane polarized radiation fields 116, 168, i.e. zero retardation, are produced. Therefore the appearance of cross-components 170, 172 at positions 174, 176 of crossed analyzer 178 indicate that binary 1's are stored in locations 114, 118 and the absence of any cross-components at positions 180, 182 indicate binary 0's are stored in locations 112, 116. A lens 184 may be used to direct the radiation transmitted by analyzer 178 to sensor 186.

The use of this invention as a difference detector is shown by the image comparator of FIG. 6. A first image 190 including dark spots 192, 194, 196, 198, 200, 202, light spots 204, 206, 208, 210, 212, and a gray spot 214 is projected on to photoconductor layer 216 of device 218 by lens 220 and partial reflecting mirror 222. The conductance pattern established in layer 216 by the incident image varies, at electro-optic birefringent layer 224, the electric field supplied by battery 226 across electrodes 228, 230. The polarity of the field across layer 224 can provide relative retardation of components of radiation of the sense that produces an elliptically polarized radiation field of counterclockwise rotation and of a magnitude dependent upon the intensity of the incident image as indicated by fields 192', 194', 196', 198', 200', and 202' corresponding to dark spots on image 190, fields 204', 206', 208', 210', and 212' corresponding to light spots on image 190 and field 214' corresponding to gray spot 214 of image 190.

A second image 240 including dark spots 242, 244, 246, 248, 250, 252, light spots 254, 256, 258, 260, 262 and a gray spot 264 is projected on to photoconductor layer 266 of device 268 by lens 270 and partially reflecting mirror 272. The conductance pattern established in layer 266 by the incident image varies, at electro-optic birefringent layer 274, the electric field supplied by battery 276 across electrodes 278, 280. The polarity of the field across layer 274 is opposite to that across layer 224 and causes relative retardation of the sense that produces an elliptically polarized radiation field of clockwise rotation and of a magnitude dependent upon the incident image as indicated by fields 242', 244', 246', 248', 250', 252' corresponding to dark spots on image 240, fields 254', 256', 258', 260', 262' corresponding to light spots on image 240, and field 264' corresponding to gray spot 264 of image 240. Radiation 282 plane polarized as indicated by arrow 284 from source 286 passes through mirror 222 and the components of radiation 282 are modulated by the relative retardation producible by layer 224 as follows: portions of the radiation passing through areas of layer 224 subject to high electric field intensity emerge as elliptically polarized radiation of counterclockwise rotation, fields 204', 206', 208', 210', 212'; portions of the radiation passing through areas of layer 224 subject to low or zero electric field intensity emerge plane polarized as they were, fields 192', 194', 196', 198', 200', 202'; and the portions of the radiation passing through the area of layer 224 subject to medium electric field intensity emerge as elliptically polarized radiation more eccentric than that emerging from the high intensity electric field area but of the same counterclockwise rotation, field 214'. So polarized, the radiation passes through mirror 272 and is modulated by the relative retardation capability of layer 274 controlled by image 240. The effect of the modulation of the fields of radiation from particular areas of layer 224, by the corresponding areas of layer 274 are shown in terms of the resulting fields depicted in phantom on corresponding areas of analyzer 288. The opposite senses but equal magnitudes of relative retardations that produce fields 212', 262'; 204', 256'; 206', 258' result in plane polarized fields 290, 292, 294, respectively. The zero relative retardations that produce fields 192', 242'; 194', 244'; 198', 248'; 200', 250'; 202', 252' result in plane polarized fields 296, 298, 300, 302, 304, respectively. The opposite senses and unequal magnitudes of relative retardations that produce fields 210', 264'; 208', 246'; 196', 260'; 214', 254' result in elliptical fields 306, 308, 310, 312, respectively. Since only the elliptical fields 306, 308, 310, 312 present cross-components 314, 316, 318, 320 transmitted by analyzer 288, the indication is that it is only in these areas of images 190 and 240 that a mismatch occurs, i.e., 208, 246; 214, 254; 196, 260; 210, 264. And the mismatch between light spot 208 and dark spot 246, and between dark spot 196 and light spot 260 produce greater cross-components 316, 318 than the mismatch between gray spot 214 and light sport 254, and between light spot 210 and gray spot 264 since the intensity difference between gray and either light or dark is less than the intensity difference between light and dark. A sensor 322 may be used to record, convert or otherwise utilize the information available at analyzer 288.

Other embodiments will occur to those skilled in the art and are within the following claims:

What is claimed is:

1. An electro-optic device capable of storing a first item of information and capable of comparing said first item of information to a second item of information, and capable of performing the Boolean expression $(A \cdot B)+(\bar{A} \cdot \bar{B})=1$ without redundant storage, comprising, in combination:

a. an electro-optic birefringent medium for producing a state of relative retardation, in the components of incident radiation, whose sense is a function of the polarity and whose magnitude is a function of the intensity of an applied electric field;

b. means, including optical means, associated with said electro-optic birefringent medium for applying and storing an electric field whose polarity and intensity vary the sense and magnitude of the relative retardation imposed on the components of radiation transmitted by said electro-optic medium to be representative of said first item of information;

c. means for exposing said electro-optic birefringent medium to radiation exhibiting a sense and magnitude of relative retardation in its components representative of a second item of information; and, d. means for detecting a component of the radiation from said means for exposing, modulated by said electro-optic birefringent medium, representative of the comparison of the sense and magnitude of the relative retardation of the components of radiation from said means for exposing and of the relative retardation imposed on the components of that radiation by said electro-optic birefringent medium, representative of said first and second items of information.

2. An electro-optic device of claim 1 wherein said means for applying and storing an electric field includes a photoconductor medium.

3. An electro-optic device of claim 1 wherein said means for applying and storing an electric field includes a photoelectret medium.

4. An electro-optic device of claim 3 in which said means for applying and storing an electric field includes a pair of electrodes connectable with a source of electrical energy, said electro-optic medium and said photoelectret medium being disposed between said electrodes.

5. An electro-optic device of claim 4 in which said photoelectret medium and said electro-optic medium are present in a single layer of material.

6. An electro-optic device of claim 5 in which said means for applying and storing an electrical field includes an electrical blocking layer adjacent said single layer of material.

7. An electro-optic device of claim 6 in which said means for applying and storing an electric field further includes switching means for reversing the polarity of the electric field applied to said electro-optic medium by said electrodes.

8. An electro-optic device of claim 1 in which said means for applying and storing an electric field includes a photoconductive medium associated with said electro-optic medium, said electro-optic medium being an electrically blocking layer, a pair of electrodes connectable to a source of electrical energy with said mediums being disposed between them, and means for directing radiation representative of said first item of information to said photoconductive medium to vary its conductance and the electric field across said electro-optic medium as a function of said first item of information.

9. An electro-optic device of claim 8 in which said means for directing includes means for simultaneously projecting said radiation representative of said first item of information to said photoconductive medium and said radiation representative of said second item of information to said electro-optic medium.

10. An electro-optic device of claim 1 in which said means for exposing includes a second electro-optic birefringent medium and second means for applying an electric field representative of said second item of information to said second electro-optic medium, and a source of polarized readout radiation for directing readout radiation through said first and second electro-optic mediums.

11. An electro-optic device of claim 10 in which said second means for applying includes a second means for storing an electric field associated with said second electro-optic medium.

12. An electro-optic device of claim 11 in which said second storage medium comprises a second photoelectret medium.

13. An electro-optic device of claim 12 in which said second photoelectret medium and said second electro-optic medium are present in a single layer of material.

14. An electro-optic device of claim 13 in which said second storage medium includes an electrical blocking layer adjacent said single layer of material.

15. An electro-optic device of claim 14 in which said second means for applying an electric field includes a second pair of electrodes connectable with a source of electrical energy, said second electro-optic medium being disposed between said second pair of electrodes.

16. An electro-optic device of claim 7 in which said means for detecting includes an analyzer.

17. An electro-optic device of claim 16 in which said analyzer comprises a crossed analyzer.

18. An electro-optic device of claim 17 in which said means for detecting further includes sensing means for sensing the intensity of the radiation transmitted by said analyzer.

19. An electro-optic device of claim 18 in which said electro-optic medium includes a plurality of portions each of which is capable of imposing on transmitted radiation a relative retardation whose sense and magnitude are functions of the polarity and intensity of the applied electric field.

20. An image comparator capable of performing the Boolean expression $(A\cdot B)+(\bar{A}\cdot\bar{B})=1$ without redundant storage, comprising, in combination:

a. a first electro-optic birefringent medium for producing a state of relative retardation, in the components of incident radiation, whose sense is a function of the polarity and whose magnitude is a function of the intensity of an applied electric field;

b. first means, including optical means, associated with said first electro-optic birefringent medium for applying an electric field whose polarity and intensity vary the sense and magnitude of the relative retardation imposed on the components of radiation transmitted by said electro-optic medium to be representative of a first image;

c. a second electro-optic birefringent medium for producing a state of relative retardation in the components of incident radiation whose sense is a function of the polarity and whose magnitude is a function of the intensity of an applied electric field;

d. second means, including optical means, associated with said second electro-optic birefringent medium for applying an electric field whose polarity and intensity vary the sense and magnitude of the relative retardation imposed on components of radiation transmitted by said electro-optic medium to be representative of a second image;

e. means for transmitting readout radiation through both electro-optic birefringent mediums; and, f. means for detecting a component of the readout radiation after it has been transmitted through both electro-optic mediums, said component being representative of a comparison of the first and second images.

21. An image comparator of claim 20 wherein said first and said second means for applying an electric field both include a photoconductive medium associated with said electro-optic mediums, a pair of electrodes connectable to a source of electrical energy with said mediums between them and means for directing radiation representative of said first image and said second image to the respective photoconductive mediums to vary their conductance and the electric field across the respective electro-optic mediums as a function of the first and second images, respectively.

22. An image comparator of claim 21 in which said means for detecting includes an analyzer.

23. An image comparator of claim 22 in which said analyzer is a crossed analyzer.

24. An image comparator of claim 23 in which said means for detecting further includes sensing means for sensing the intensity of the radiation transmitted by said analyzer.

25. An image comparator of claim 24 in which said first and said second electro-optic mediums include a plurality of portions each of which is capable of imposing on transmitted radiation a relative retardation whose sense and magnitude are functions of the polarity and intensity of an applied electric field.

26. An image comparator of claim 25 in which said first means for applying an electric field applies a field of one polarity to said first electro-optic birefringent medium and said second means for applying an electric field applies a field of opposite polarity to said second electro-optic birefringent medium.

27. An image comparator of claim 26 wherein said means for transmitting readout radiation comprises a source of polarized radiation.

* * * * *